M. Mellen,
Stump Elevator.
N° 63,918.          Patented Apr. 16, 1867.
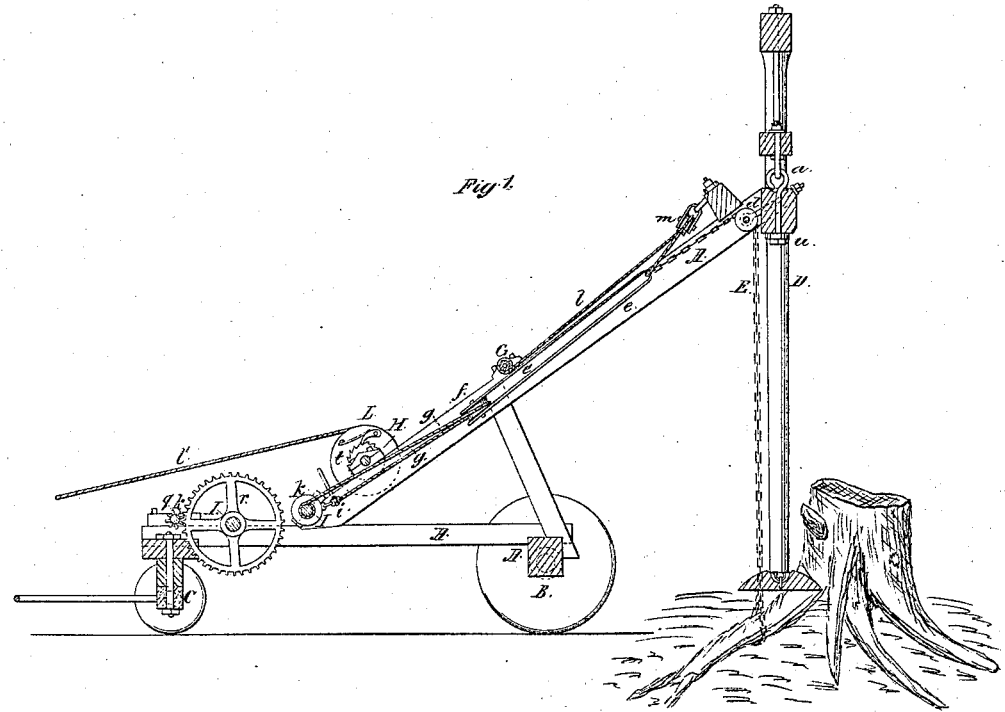
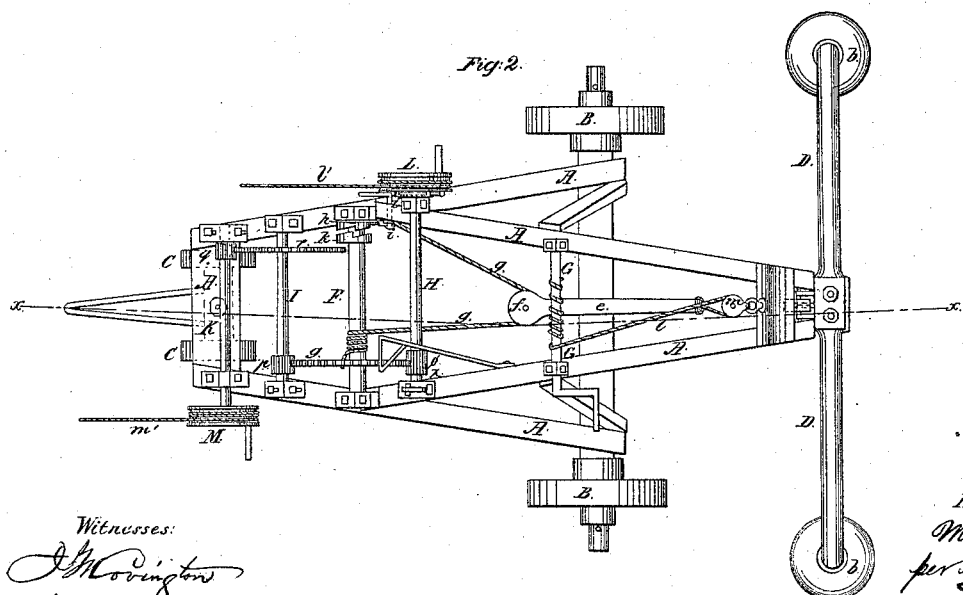
Witnesses:
Inventor:
M. Mellen
per Munn & Co,
Attorneys

United States Patent Office.

M. MELLEN, OF RICHLAND STATION, NEW YORK.

Letters Patent No. 63,918, dated April 16, 1867; antedated April 11, 1867.

---

IMPROVEMENT IN STUMP EXTRACTOR.

---

The Schedule referred to in these Letters Patent and making part of the same.

---

TO ALL WHOM IT MAY CONCERN:

Be it known that I, M. MELLEN, of Richland Station, in the county of Oswego, and State of New York, have invented a new and improved Stump Extractor; and I do hereby declare that the following is a full, clear, and exact description thereof, which will enable others skilled in the art to make and use the same, reference being had to the accompanying drawings, forming part of this specification, in which—

Figure 1 represents a vertical longitudinal section of my improved stump extractor, the plane of section being indicated by the line $xx$, fig. 2.

Figure 2 is a plan or top view of the same.

Similar letters of reference indicate like parts.

This invention relates to a stump extractor, which will do its work with the greatest efficiency, and which is so constructed that power may be applied to it on each side or on both, as may be required, and which will furthermore allow of an easy adjustment of all its parts, and may be conveyed easily from one place to another.

The invention consists—

First, in applying to the main frame of the machine, and near to that part of the same where the cable goes down, which is wound around the stump, a support, consisting of two legs, running together at the top, and there held to the machine by means of a pin around which the support is allowed to turn. To the lower extremities of the legs of the support are attached by staple hinges self-adjusting feet, so that the support may stand firm upon uneven ground. Second, in attaching to the main shaft of the machine a loose collar to which one end of a rope is attached, while the other end is attached to and winds around the said main shaft; the loop of this rope passes over a pulley on a rod which is attached to the main chain. The aforesaid collar turns free on the main shaft, or rather allows the latter to turn within itself when held stationary by a small hook fitting into a ring attached to the collar; in that case, only one end of the rope is pulled, but when the speed wants to be doubled, I release the collar from the hook, when the collar will be held to the shaft by a clutch and both ends of the rope are wound up. Third, in attaching to the machine two or more drums, around which the ropes are wound, by which the machine is driven when unwinding, and in so constructing the machine that the drums may be used alternately, one winding up while the other is unwinding. Fourth, in so constructing the bearings of the different axles on the machine that the latter may easily be adjusted for throwing any desired part of the machine out of gear when needed.

A represents a frame by which the whole machine is held together. It is supported by four wheels, B B and C C. The frame ascends from the front, and at its highest end is connected by means of a swivel-pin, $a$, to the rear support D. The latter can be turned at will so as to avoid obstructions, and is provided with feet, $b$, which turn on staple joints, $c$, so that they will adapt themselves to uneven ground. The cable E, by which the stump is to be raised, passes over a pulley, $d$, at the rear of the frame, and is attached to a connecting-rod, $e$. This connecting-rod holds at its front or lower end a pulley, $f$, around which the rope $g$ goes, by which the cable is operated. One end of the rope $g$ winds around the main shaft F, as seen in fig. 2, while its other end is attached to the collar $h$, said collar turning loosely in the shaft F, or allowing the shaft to turn in it, while it is held stationary by a small hook, $i$, passing through a ring attached to the collar; when unhooked though it is operated by a clutch, $k$, secured to the main shaft, and both ends of the rope $g$ are then wound around the shaft. A rope, $l$, wound around the shaft G, and passing over a pulley, $m$, unwinds the rope $g$ when needed, by pulling up the rod $e$, as seen in the drawings, which is effected by turning a crank, $n$, attached to the shaft G. Power is applied to the main shaft F, either by pinion O, attached to the shaft H, or by a pinion, $p$, on shaft I, the latter receiving motion through a pinion, $q$, on shaft K gearing into the cog-wheel $r$, on shaft I. Both the pinions $o$ and $p$ gear into the cog-wheel S, on the main shaft F, and either of them can be easily thrown out of gear by means of their bearings being provided with slots, so that by simply loosening the bolts by which they are held to the frame, the shafts H, I, or K can at once be removed far enough to be thrown out of gear. Two drums L and M are attached one respectively to the shafts H and K. Around these are wound the ropes $l'$ and $m'$, to which the horses are attached. They may be used alternately. It is obvious that by pulling on the rope $m'$, a greater amount of power is gained than by using the rope $l'$. When one is used the other one will be wound up, and *vice versa*. Thus the machine can be kept in constant motion by simply hitching the horses, after they have unwound one of the ropes $l$ or $m$, to its substitute. The drums are prevented from turning in the wrong direction by ratchets $t$, as seen in fig. 1. One drum may be attached to each end of the shafts H and K, which will enable me to use two horses at each rope, when desired. The supports D which take a great part of the strain from the machine must be uncoupled from the same by loosening the nut $u$, when the pin $a$ can be withdrawn. The supports are then placed upon the machine, and the whole can be easily transported on the wheels B and C.

What I claim as new, and desire to secure by Letters Patent, is—

1. The combination of the support D, and pin $a$, with the frame A of the machine, and the adjustable feet $b$, attached to the lower extremities of the support, substantially in the manner and for the purpose herein specified.

2. The combination of the main shaft F, and clutch K, with the loose collar $h$, and hook $i$, operating substantially as and for the purpose herein shown and described.

3. The application to the stump extractor of two or more drums L and M, substantially as and for the purpose herein specified.

4. The adjustable slotted bearings of the axles H, I, and K, for the purpose of throwing any portions of the machine in or out of gear, substantially in the manner herein shown and described.

M. MELLEN.

Witnesses:
   E. E. CROPSEY,
   REUBEN PECK.